Dec. 22, 1970   H. L. BRESNICK   3,549,447
IMAGING SYSTEM
Filed July 1, 1968
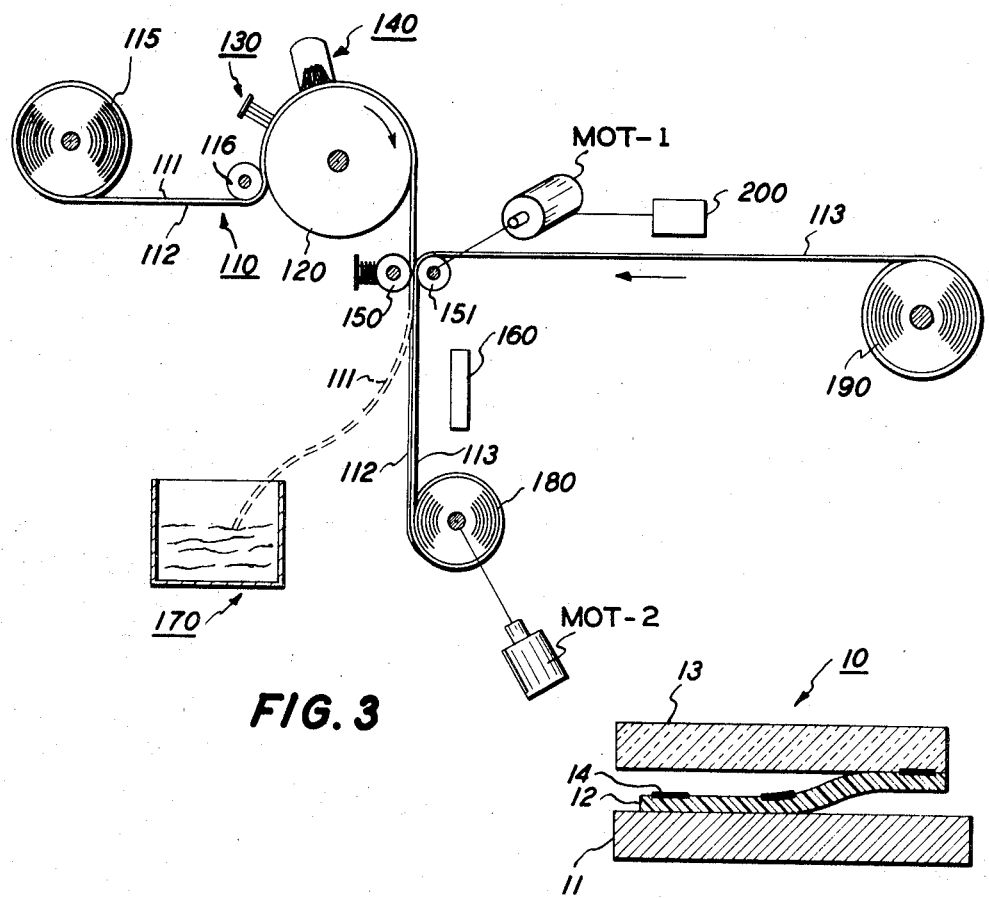
FIG. 3
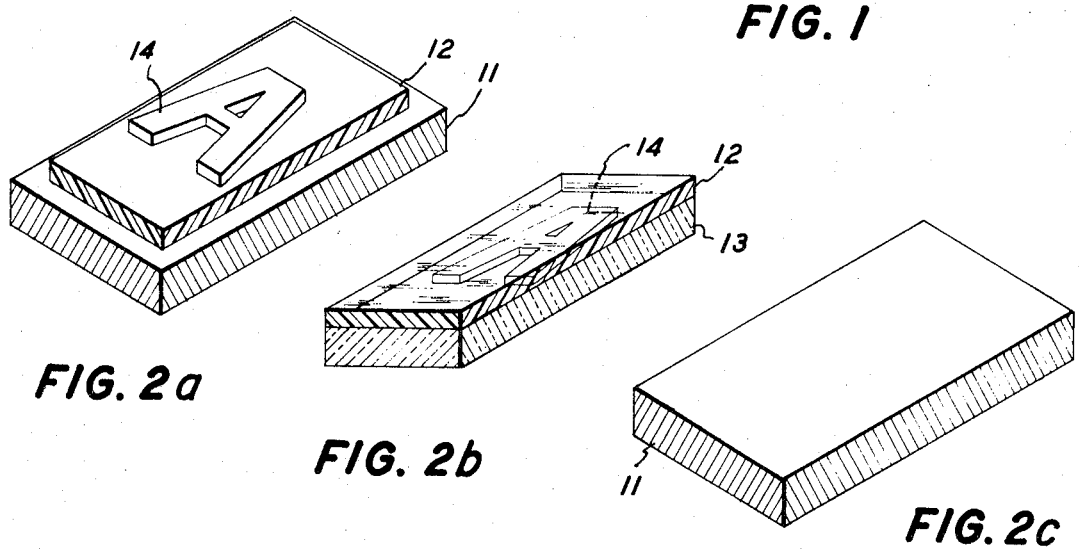
FIG. 1
FIG. 2a
FIG. 2b
FIG. 2c
INVENTOR.
HERBERT L. BRESNICK
BY
ATTORNEYS : 3,549,447
Patented Dec. 22, 1970

3,549,447
IMAGING SYSTEM
Herbert Leo Bresnick, Rochester, N.Y., assignor to Xerox Corporation, Rochester, N.Y., a corporation of New York
Filed July 1, 1968, Ser. No. 741,628
Int. Cl. B44c 5/00
U.S. Cl. 156—230                                   9 Claims

ABSTRACT OF THE DISCLOSURE

A method of adding graphic data to a support material, for example photographic film, by electrographically forming a latent electrostatic image on a suitable substrate, rendering the latent electrostatic image visible by the application of electroscopic toner powder, and transfering the substrate and developed electroscopic toner powder image supported thereon to the support material to permanently encapsulate the transferred image to the support surface.

BACKGROUND OF THE INVENTION

This invention relates in general to imaging systems and in particular to a novel image transfer and fixing method.

More specifically this invention relates to a method of simultaneous transfer and permanent fixing of an electrographically formed, electroscopic toner powder image.

In many applications it is highly desirable to add graphic information to photographic film. Prior to exposure of the film, this graphic information may be added by appropriate exposure to the image and graphic information. However, after exposure and more particularly development, a major problem exists in adding the graphic information to the image recorded on the film. In many applications, such as interpreting the data on the photograph, the addition of such information as lighting angles, photographic angles and elevation of the camera from the photographed subject are highly desirable.

Heretofore, such graphic information has been added to the developed photographic films by means of ink stamps, or impact printers utilizing gold foils. As can readily be appreciated these procedures are essentially a manual operation and are very slow. In addition, such prior art methods of adding graphic information to photographic film are not resistant to the solvents utilized in film cleaning processors and therefore fade or are entirely removed when the photographic film is passed through commercially available film cleaning apparatus.

One attempt to solve the problem of deterioration of the added graphic information on the photographic film due to abrasion and film cleaning solvents has been an attempt to protect the information by the addition of a layer of commercially available transparent adhesive tapes. While this solution has been successful in limited applications, it has not been generally effective in that the adhesive tapes are excessively thick and therefore incompatable with use on spool type photographic film. While the use of a transparent adhesive tape does protect the added graphic information from abrasive wear, again the problem of cleaning the film through commercial film processors results in stripping the adhesive tapes from the film due to the solvent action of the cleaners used in these machines.

It is quite apparent that none of these prior art methods or apparatus are applicable to a high speed imaging system for automatically adding graphic information onto developed photographic film.

One attempt to solve the problems of automatically adding graphic data to developed photographic film has been the use of a xerographic processor to create the information to be added by exposing a film strip containing the data to form and develop a latent electrostatic image of the data on a photoreceptive surface and transfer the developed image to a photographic film by means of a corona discharge. The transferred electroscopic toner powder image on the developed film is then exposed to selected wavelengths of radiation which are transmitted by an optical filter interposed between the film material and an intermittently activated source of short duration, high intensity electromagnetic radiation. Such an apparatus is disclosed in copending application "Xerographic Fusing Method and Apparatus" Ser. No. 595,153, filed Nov. 17, 1966 in the name of Raymond Zoppoth. However, this apparatus is much more expensive and complex than the invention disclosed in this application. In addition, commercially available electroscopic toner powders utilized in xerographic processors are dissolved by the solvents utilized to clean the processed film and, therefore, the toner powder images are removed from the film.

SUMMARY OF THE INVENTION

It is, therefore, an object of this invention to improve methods of adding graphic data onto a film base without damaging the base material.

Another object of this invention is to improve methods of adding graphic information onto a film substrate by permanently protecting the added information from abrasive wear with a minumal thickness protective layer.

A further object of this invention is to improve methods for adding graphic information to a developed photographic film by protecting the graphic information from the solvent action of film cleaning processors.

Still another object of this invention is to improve methods of adding information to photographic film by quickly, inexpensively and automatically transferring the graphic information to the film substrate and permanently encapsulating the added information to the film base.

These and other objects are attained in accordance with the present invention wherein there is proved a novel method of electrographically forming a latent electrostatic image on a suitable substrate, rendering the latent electrostatic image visible by the application of electroscopic toner powder, and transferring the substrate and developed electroscopic toner powder image supported thereon to a suitable support material such as photographic film thereby permanently encapsulating the transferred image to the film.

DESCRIPTION OF THE DRAWINGS

Further objects of this invention, together with additional features contributing thereto and advantages accruing therefrom, will be apparent from the following description of one embodiment of the invention when read in conjunction with the accompanying drawings, wherein:

FIG. 1 is an enlarged representation of the laminate formed when the graphic information is transferred on a suitable insulative encapsulating lamina to a photographic film from the original substrate.

FIGS. 2a, 2b, and 2c schematically illustrate the various steps of an image formed on a suitable insulative material lamina and encapsulated onto a photographic film after being removed from the original substrate; and FIG. 3 is a schematic illustration of an automatic processor for performing the method disclosed in this application.

DESCRIPTION OF A PREFERRED EMBODIMENT

Referring now to FIG. 1, the imaging structure formed in accordance with the process of this invention comprises a laminate member 10 including an electrically conductive substrate 11 of aluminum or the like having a transparent hot melt electrically insulative or dielectric lamina 12 as for example a lamina comprising 85% polymethyl methacrylate, 10% chlorinated rubber and 5% butyl benzyl phthalate, releasably adhering thereto, to provide an electrical charge storage interface as will be explained in detail hereinafter. Hot melt adhesives 12 are bonding agents which achieve a solid state and resultant strength by cooling, as contrasted with other adhesives which achieve the solid state through evaporation or removal of solvents. The transparent hot melt lamina 12 is uniformly transparent and at the same time uniformly releasable from the conductive substrate 11 to a photographic film 13 upon application of heat. As shown in FIG. 1, the transparent hot melt insulator lamina 12 is stripped from the electrically conductive substrate 11 onto a photographic film base material 13 by the application of heat. The transparent hot melt insulative lamina 12 is thereby bonded to the photographic film to permanently encapsulate an electroscopic toner powder image 14 previously formed on the lamina surface.

FIGS. 2a, 2b, and 2c illustrate portions of the laminate member 10 during the process of permanently bonding the graphic data onto the photographic film. As shown in FIG. 2a, transparent hot melt insulator lamina 12 is releasably bonded onto the electrically conductive substrate 11 and an image "A" of graphic data formed on the insulative lamina by the electrographic process.

For a better understanding of the invention of this application the electrographic process utilized to form the image "A" will be briefly described. In the electrographic process a sheet of insulating support material, usually paper which has been chemically treated or coated with a transparent plastic to provide an electrical charge retaining insulative medium is supported on an electrically conductive backing and given an electrostatic charge pattern on its surface in accordance with a desired image to be produced, thereby creating a latent electrostatic image on the insulative surface in the configuration of the desired image. Development of the latent electrostatic image is effected by developers which comprise, in general, a mixture of suitable, pigmented or dyed resin-based powder, hereinafter referred to as toner upon which an electrostatic charge has been placed of a polarity opposite to that of the latent electrostatic image on the insulating material. In the development of the latent electrostatic image the toner powder is brought into surface contact with the insulative material and is held thereon by the electrostatic forces in a pattern corresponding to the latent electrostatic image. Various suitable development methods well known to those skilled in the art are disclosed in U.S. Pat. No. 2,618,551 issued to L. J. Walkup and U.S. Pat. No. 2,874,063 issued to H. G. Greig. After development of the latent electrostatic image, the electroscopic toner powder image is normally permanently affixed to the electrographic sheet by any suitable means such as heat fusing.

Referring again to FIG. 2, after the graphic information "A," which is to be added to the photographic film 13, has been electrographically bonded to the transparent hot melt insulator lamina 12 (FIG. 2a) the electroscopic toner powder image bearing insulator lamina 12 is brought into contact with the photographic film and exposed to a heat source. This heated contact effects a transfer of the lamina 12, bearing the toner powder image, from the electrically conductive substrate 11 onto the photographic film 13 thereby permanently encapsulating the graphic data "A" onto the photographic film. Due to the transparency of the hot melt insulator lamina, the electrographically formed electroscopic toner powder image "A" will be visible on the photographic film 13 through the lamina 12.

After the transparent hot melt insulative lamina 12 is removed from the electrically conductive substrate 11, the substrate (FIG. 2c) is left entirely bare of insulator or dielectric material and therefore the conductive substrate 11 may be discarded or again be reprocessed to have another transparent hot melt insulator lamina bonded thereto for further processing.

Referring now to FIG. 3, there is shown an automatic apparatus for adding graphic information to developed photographic film. Materials such as described with reference to FIGS. 1 and 2, are selected for their flexible properties and are contained as a web 110 on a friction braked supply reel 115, and comprises a rtansparent hot melt insulative lamina ribbon 112 releasably bonded to a web or strip of aluminum foil 111. These materials are passed about a roller 116 which conforms the web 110 to the curvature of an electrically conductive drum 120 rotatable in the direction indicated by the arrow to advance the web past a suitable electrically coupled character matrix 130 which automatically places a preselected latent electrostatic image on the insulative lamina in accordance with the graphic information which is desired to be placed onto the photographic film. A suitable character matrix is disclosed in Stowell, P. A., "Techniques of Digital Electrostatic Recording," AIEE Conference Paper CP61–441, 1959—as described in Xerography by Dessauer & Clark, pp. 439–440 (1965, Focal Press Ltd.) and reference is made thereto for the details disclosed therein. After placement of the latent electrostatic image, the web is further advanced past a development station 140 whereat the latent electrostatic image is rendered visible upon the application of electroscopic toner particles by a suitable apparatus such as of the type disclosed in the aforementioned Greig patent. Subsequent to the development of the latent electrostatic image on the transparent insulative material, the web 110 is passed through a pair of silicon rubber heated pressure drive rollers 150 and 151, roller 150 being spring loaded against the heated roller 151 to maintain a predetermined pressure between the electroscopic toner powder bearing lamina material 112 and the web of photographic film 113 upon which it is desired to add the information. Heated roller 151 is driven by a suitable motor MOT–1 to advance the two webs 110 and 113 at a speed related to the temperature of roller 151 such that the lamina 112 will be stripped from the substrate 111 and bonded to the photographic film 113. While a roller temperature of approximately 140° F. is preferred, it is to be understood that the transfer of the hot melt lamina 112 to the photographic film 113 is dependent upon temperature and web speed (i.e., the time the two webs are passing through the contact arc of the two rollers 150 and 151). Therefore, many combinations of temperature and web speed are possible as long as the lamina 112 is stripped from the substrate 111 and bonded to the film 113 without the film being damaged by excessive heat.

A controller 200 is provided to synchronize the drive of motor MOT–1 with the input to the character matrix 130 to insure proper placement of the latent electrostatic image on the web 110 with the proper frame of the photographic film 113.

As the two webs are passed between the heated pressure rollers, the transparent hot melt insulative lamina 112 is removed from the aluminum foil substrate 111 and adhered to the surface of the photographic film 113 thereby permanently encapsulating the developed toner powder image onto the photographic film upon cooling of the hot melt lamina. A fan 160 is positioned adjacent the passing webs 110 and 113 to aid in the cooling of the hot melt lamina on the photographic film 113. After transfer of the hot melt lamina from the web of aluminum foil, the aluminum foil is passed into a suitable receptacle 170 whereby it may be reclaimed and again coated with the hot melt lamina for recycling once more through the machine or discarded as desired. The photographic film bearing the encapsulated graphic information is then wound from the friction brake spool 190 upon a suitable spool 180 by means of a torque motor MOT–2 operatively coupled thereto to drive the web of photographic film in the direction shown by the arrow.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A method of adding graphic information onto a support material including the steps of
    placing a layer of a transparent insulative material upon an electrically conductive substrate,
    said insulative material characterized in its ability to be releasably stripped from said electrically conductive substrate onto a support material in contact therewith upon exposure to heat,
    forming a latent electrostatic image on the transparent insulative material by placing an electrostatic charge pattern onto the insulating material in the configuration of a desired image,
    rendering the latent electrostatic charge pattern visible by applying electroscopic toner powder thereto having an electrical charge of a polarity opposite to that of the latent electrostatic image,
    contacting the transparent insulative material supported on the electrically conductive substrate and bearing the visible electroscopic toner powder image with a support material to form an imaging laminate,
    heating the imaging laminate to transfer the transparent insulative material bearing the visible electroscopic toner powder image from the electrically conductive substrate onto the support material, and
    stripping said electrically conductive substrate lamina from said transparent insulative material bearing support material whereby the transparent insulative material is permanently bonded to the support material encapsulating the electroscopic toner powder image thereon.

2. The method of claim 1 wherein the support material comprises photographic film.

3. The method of claim 1 wherein the step of heating the imaging laminate comprises heating to a temperature sufficient to transfer the transparent insulative material to the support material without a physical alteration of said support material.

4. The method of claim 1 wherein the step of heating the imaging laminate comprises heating to a temperature of approximately 140° F.

5. The method of claim 1 wherein the step of contacting the transparent insulative material supported on the electrically conductive substrate and bearing the visible electroscopic toner powder image with the support material to form an imaging laminate comprises passing the insulative material and support material between a pair of pressure rollers.

6. The method of claim 1 wherein the steps of contacting the transparent insulative material supported on the electrically conductive substrate and bearing the visible electroscopic toner powder image with a support material to form an imaging laminate, and
    heating the imaging laminate to transfer the transparent insulative material bearing the visible electroscopic toner powder image from the electrically conductive substrate onto the support material are performed simultaneously by passing the insulative material and support material between a pair of heated pressure rollers.

7. The method of claim 1 wherein said transparent insulative material comprises a hot melt lamina of approximately 85% polymethyl methacrylate, approximately 10% chlorinated rubber, and approximately 5% butyl benzyl phthalate.

8. The method of claim 1 wherein said electrically conductive substrate comprises an aluminum foil.

9. The method of claim 1 wherein the step of forming a latent electrostatic image on the transparent insulative material by placing an electrostatic charge pattern onto the insulating material in the configuration of the desired image comprises electrographically placing a latent electrostatic image in the configuration of a desired image on the transparent insulative material.

References Cited

UNITED STATES PATENTS

| 2,671,020 | 3/1954 | Grumbine et al. | 96—83X |
| 3,340,121 | 9/1967 | Lawrenz | 156—233 |
| 3,443,944 | 5/1969 | Wise | 96—38.4X |
| 3,492,121 | 1/1970 | Yackel | 96—83 |

FOREIGN PATENTS

| 732,561 | 4/1966 | Canada | 156—230 |

LELAND A. SEBASTIAN, Primary Examiner

U.S. Cl. X.R.

96—38.4, 83; 156—233, 247; 355—3, 17